L. H. FERGUSON.
TIRE.
APPLICATION FILED AUG. 23, 1912.
1,092,119. Patented Mar. 31, 1914.
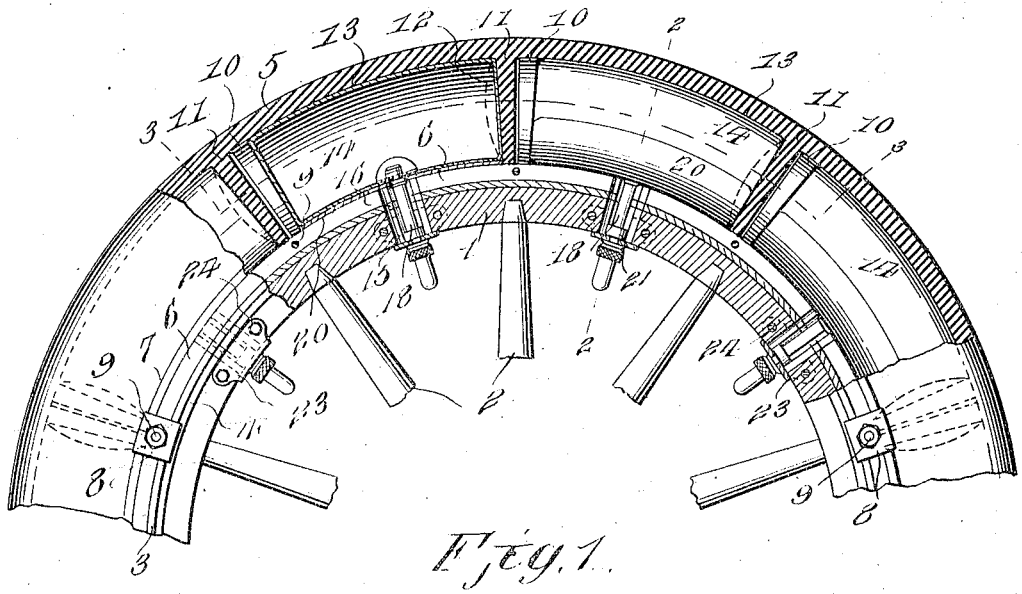
Fig. 1.
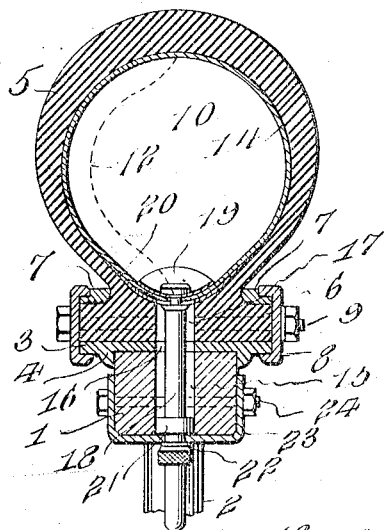
Fig. 2.
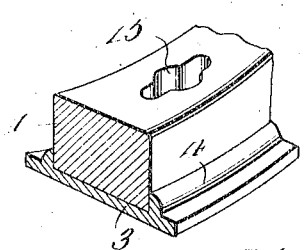
Fig. 4.
Fig. 3.
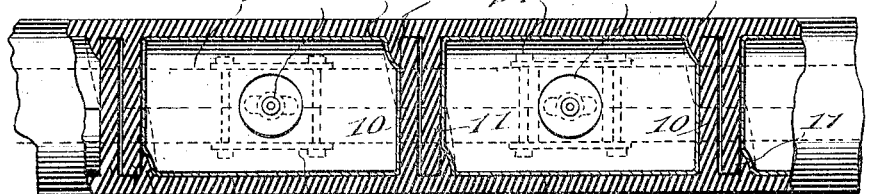
Witnesses
Frank Hugh
C. Edwardson Jr.
Inventor
Lyman H. Ferguson,
By Victor J. Evans
Attorney

UNITED STATES PATENT OFFICE.

LYMAN H. FERGUSON, OF ITHACA, NEW YORK, ASSIGNOR OF ONE-THIRD TO WHEELER SMITH, OF ENFIELD, NEW YORK.

TIRE.

1,092,119.

Specification of Letters Patent.  Patented Mar. 31, 1914.

Application filed August 23, 1912. Serial No. 716,745.

*To all whom it may concern:*

Be it known that I, LYMAN H. FERGUSON, a citizen of the United States, residing at Ithaca, in the county of Tompkins and State of New York, have invented new and useful Improvements in Tires, of which the following is a specification.

This invention relates to vehicle tires, and more particularly to pneumatic tires.

One of the principal objects of the invention is to provide a simple and efficient structure of this character which may be repaired with extreme rapidity and without replacing an entire length of tube such as is now common practice.

Another object of the invention is to provide a structure of this type embodying a plurality of separating partitions between which are located independent pneumatic tubes removable through the felly of the wheel and replaceable in a like manner.

Still another object of the invention is to provide a tire having a plurality of independent pneumatic tubes removable through the felly and supported around the aperture by the valve tube itself and by a clip removably connected to the felly.

Further objects of the invention will appear as the following specific description is read in connection with the accompanying drawings, which form a part of this application and in which:—

Figure 1 is a side elevation partly in section. Fig. 2 is a transverse sectional view on the line 2—2 of Fig. 1. Fig. 3 is a longitudinal horizontal section taken on the line 3—3 of Fig. 1. Fig. 4 is a detail perspective view looking from the under side of the felly.

Referring more particularly to the drawings, 1 represents a felly which is connected to the hub, not shown, by the spokes 2 and has secured upon its outer periphery a tire receiving rim 3, provided as is usual with depending flanges 4 to straddle the felly.

Mounted upon the rim 3 is an annular tire body 5 constructed similarly to the ordinary pneumatic shoes and being provided with laterally extending annular flanges 6, which engage the rim 3 and are adapted to be clamped thereon by means of the annular rings 7 and the clips 8. These clips are held in position straddling the ring 7 and the rim 3, by means of bolts 9 which pass through the clips and through the flanges 6.

As before stated the tire is constructed in the manner of ordinary pneumatic shoes, being open on its under side to permit opening the tire for removal of the core of the mold and for any other suitable purpose. Connected to one half of the tire and extending entirely across the interior of the same is a partition 10 and a similar partition 11 is connected to the opposite half of the tire and extends across the interior of the same in the opposite direction. The free ends of these partitions are held against lateral displacement by being arranged between the connected portion of the opposite partition and between ribs 12 formed integrally with and projecting inwardly from the sides of the body. These partitions are arranged in pairs of alternately extending partitions and form compartments 13 for independent pneumatic tubes 14.

Adjacent each compartment the felly 1, rim 3, and the body of the tire 5 are provided with registering apertures 15, 16 and 17 respectively, all of which are of double key-hole formation and are of sufficient size to permit the insertion of the tubes 14. These tubes are reinforced around the valve nipple 18 by means of strips 19 and 20, the latter being arranged on the outside of the tube and extending the full length thereof.

Valve tubes 18 are connected to the tubes 14 in any suitable or approved manner and preferably have the shoulder on the outside of the pneumatic tube formed so as to fit the double key-hole openings in the felly, rim and tire. Adjacent the outer end of the tube there is formed a shoulder 21 and a reduced nipple extension 22 which is of such size as to pass conveniently through a retaining clip 23 removably secured to the felly by means of the bolts 24.

It will be noticed from the foregoing that the pneumatic tubes may be conveniently removed and replaced through the openings in the tire, rim and felly and that when in position in the body are held against blowing out through the openings by means of the valve tube itself and the clips 23 which form abutments for the shoulders 21.

What is claimed is:—

1. In a device of the character described, a combination with an apertured felly, of a tire casing secured to said felly and having apertures therein registering with the apertures in said felly, a series of partitions arranged within said casing and forming compartments therein, pneumatic tubes disposed within said compartments, a valve nipple projecting from said pneumatic tubes and extending through said apertures, perforated clips removably mounted upon said felly, shoulders formed on the free ends of said nipples and within said apertures of the felly and being adapted to engage said clips to prevent the tubes from blowing out of said casing.

2. In combination with an apertured felly, a casing mounted upon said felly and provided with a series of chambers having an aperture therein registering with the apertures of said felly, removable clips disposed on the underside of said felly and having a perforation therein registering with one of said apertures of the felly, said perforations being smaller than the apertures of the felly, pneumatic tubes within said chambers, a valve nipple projecting from each of said tubes and extended through said aperture and said perforation, a collar on the lower end of said valve nipple and of the same diameter as said apertures, and said collar being adapted to engage said clips for holding said nipple within said aperture.

3. In combination with an apertured felly, a casing mounted upon the felly and having apertures therein registering with the apertures of said felly, removable clips disposed upon the underside of said felly each having a perforation therein registering with an aperture of the felly, said perforation being smaller than the apertures of the felly, a pneumatic tube within said casing, valve nipples projecting from said tube and extended through said apertures and said perforations, an enlargement formed near the lower ends of said valve nipples and substantially of the same size as said apertures, and said enlargement being adapted to engage said clips for holding said nipples within said apertures.

In testimony whereof I affix my signature in presence of two witnesses.

LYMAN H. FERGUSON.

Witnesses:
E. EDMONSTON, Jr.,
W. E. PALMER.